United States Patent [19]

Allain et al.

[11] Patent Number: 4,896,814
[45] Date of Patent: Jan. 30, 1990

[54] METHOD OF WELDING INSIDE A GROOVE MACHINED IN A SOLID STEEL PART, AND UTILIZATION OF THE METHOD FOR REPAIRING A CRACKED ROTOR

[75] Inventors: Gilles Allain, Paris; Max Nougaret, Pierrefitte, both of France

[73] Assignee: Societe anonyme dite: ALSTHOM, Paris, France

[21] Appl. No.: 225,429

[22] Filed: Jul. 28, 1988

[30] Foreign Application Priority Data

Jul. 28, 1987 [FR] France ................................. 87 10689

[51] Int. Cl.⁴ ........................... B23K 9/02; B23K 9/04; B23K 9/225; B23K 37/06
[52] U.S. Cl. .................................... 228/119; 228/165; 228/226; 228/215; 228/216; 29/402.07; 29/402.12; 29/402.13; 219/76.12
[58] Field of Search ............... 228/119, 165, 225, 226, 228/215, 216; 29/402.07, 402.12, 402.13, 402.16; 219/76.1, 76.12

[56] References Cited

U.S. PATENT DOCUMENTS

| | | | |
|---|---|---|---|
| 3,745,322 | 7/1973 | Ito et al. ................................. | 228/225 |
| 3,746,833 | 7/1973 | Ujiie ....................................... | 228/225 |
| 4,208,003 | 6/1980 | Meylan ................................. | 219/76.1 |

FOREIGN PATENT DOCUMENTS

| | | | |
|---|---|---|---|
| 2292107 | 6/1976 | France ................................. | 228/225 |
| 163091 | 12/1981 | Japan ................................... | 228/119 |
| 112655 | 7/1983 | Japan ................................... | 219/76.1 |
| 534503 | 3/1977 | U.S.S.R. .............................. | 228/225 |

OTHER PUBLICATIONS

Welding Production, No. 10, Oct. 1986, Abington, Cambridge (GB), pp. 13–15.

*Primary Examiner*—Richard K. Seidel
*Assistant Examiner*—Samuel M. Heinrich
*Attorney, Agent, or Firm*—Sughrue, Mion, Zinn, Macpeak & Seas

[57] ABSTRACT

A method of welding in a groove (1) machined in a solid alloyed steel part, characterized in that bottom passes (2) are performed and then each wall (11, 13) of the groove (1) is faced with low alloy steel filler material, heat treatment is performed so as to eliminate the stresses in the zones (18, 19) of the part adjacent to the walls (11, 13) of the groove, and the empty space (20) between the two facing layers (15, 17) is filled with low alloy steel filler materials, said operation of facing the wall (11, 13) being performed by placing a carbon steel plate (4, 4′, 2, 22′) in the groove (1) at a certain distance from said wall (13, 11), by filling the space (12, 16) between the plate (4, 4′, 22, 22′) and the wall (11, 13) with layers (14, 14′) of low alloy steel having a carbon content lying in the range 0.08% and 0.12%, and by getting rid of the steel plate (4, 4′, 22, 22′) and optionally a portion of the fill so as to leave only a layer (15, 17) on the wall (13, 11). The method can be used to get rid of a defect in a part while greatly reducing the risks of cracking.

8 Claims, 4 Drawing Sheets

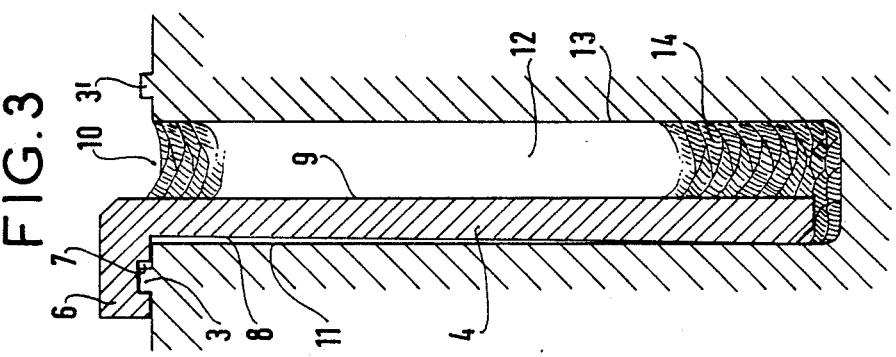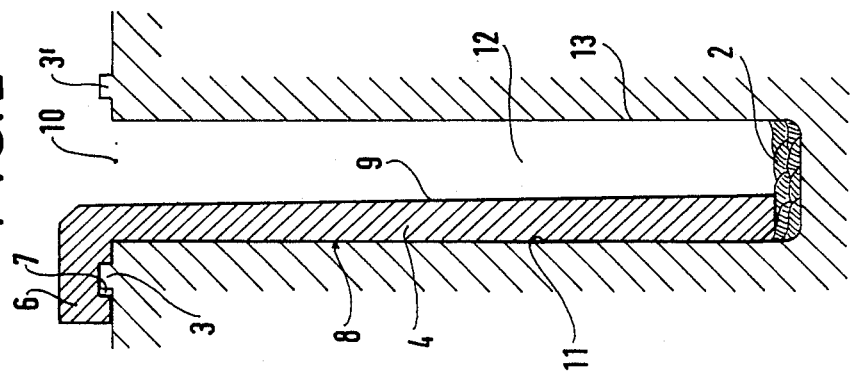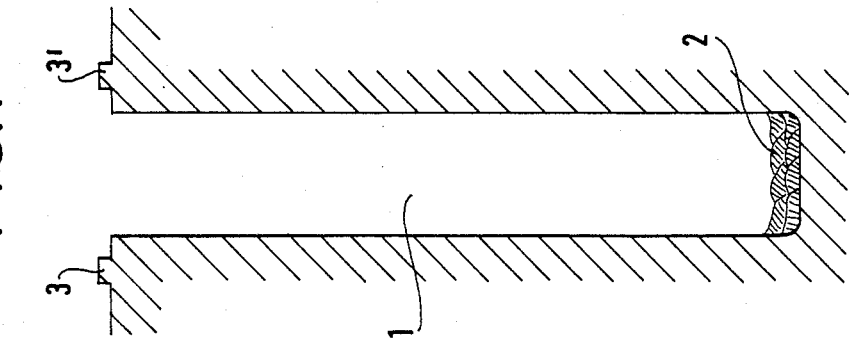

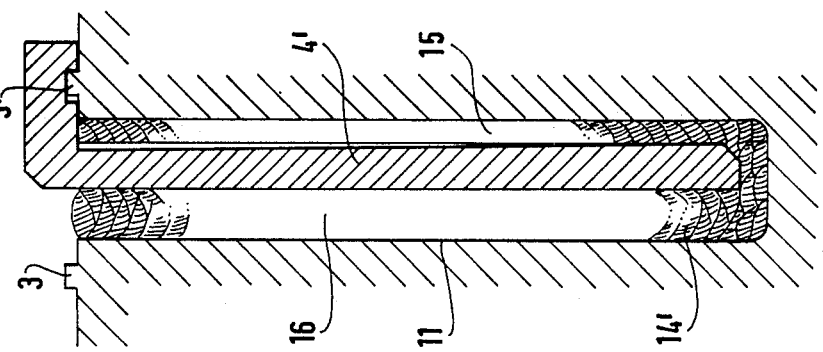
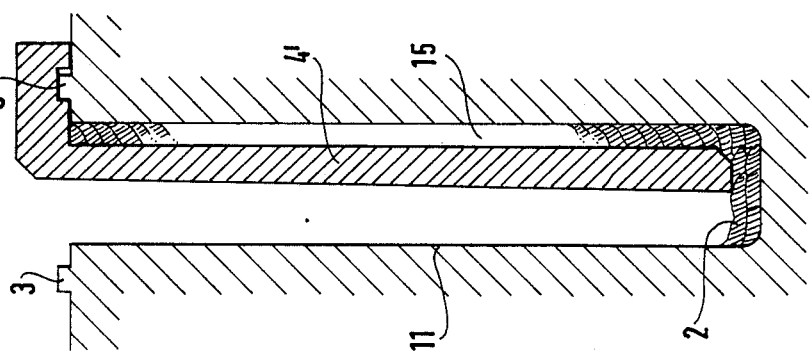
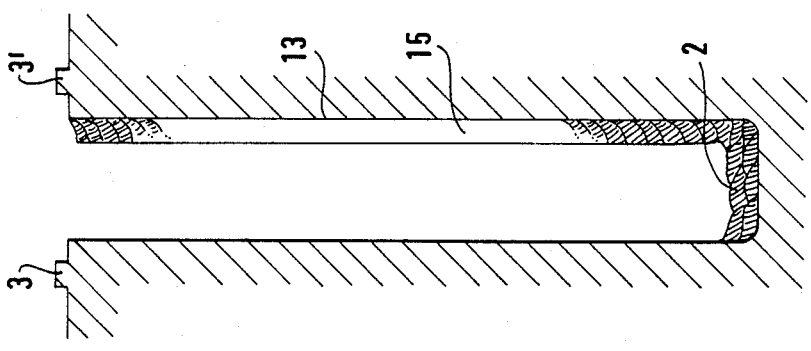

METHOD OF WELDING INSIDE A GROOVE MACHINED IN A SOLID STEEL PART, AND UTILIZATION OF THE METHOD FOR REPAIRING A CRACKED ROTOR

The present invention relates to a method of welding inside a groove machined in a solid steel part.

Such a method can be used, in particular, for repairing a cracked part, and in particular a rotor.

BACKGROUND OF THE INVENTION

Proposals have been made to repair a cracked rotor by cutting the rotor in the vicinity of the crack and then in getting rid of the cracked portion and in replacing said portion by a replacement part which is welded to the two parts of the rotor. However, this method presents difficulties, in particular for accurately aligning the two parts of the rotor.

In order to repair the rotor, the inventors have thought of machining a groove at the location of the crack in order to make the crack disappear, with the groove being of constant depth and going all the way round the rotor.

SUMMARY OF THE INVENTION

In the method of the present invention making it possible to weld inside a groove machined in a solid steel rotor and more generally in any solid steel piece, bottom passes are performed, and then each wall of the groove is faced with low alloy steel filler material, heat treatment is performed so as to eliminate the stresses in the zones of the part adjacent to the walls of the groove, and the empty space between the two facing layers is filled with low alloy steel filler material, said operation of facing the wall being performed by placing a carbon steel plate in the groove at a certain distance from said wall, by filling the space between the plate and the wall with layers of low alloy steel having a carbon content lying in the range 0.08% and 0.12%, and by getting rid of the steel plate and optionally a portion of the fill so as to leave only a layer on the wall.

Preferably, the filler metal used during the bottom passes is a non-alloyed low carbon steel.

By virtue of the method of the invention, the two walls of the groove have respective facings of easily welded material applied thereto without setting up stresses in the walls of the groove, thereby avoiding a major risk of the part being damaged. Any defect in a solid steel part can be got rid of by machining a groove which may be straight or circular at the location of the defect and by welding said groove in accordance with the invention.

BRIEF DESCRIPTION OF THE DRAWINGS

An implementation of the invention and a variant thereof are described by way of example with reference to the accompanying drawings, in which:

FIGS. 1 to 7 show the various stages of the welding method of the invention.

MORE DETAILED DESCRIPTION

In FIG. 1, a groove 1 formed in a solid steel rotor is shown in section. This groove is circular and has been machined for the purpose of getting rid of a crack.

The width of the groove depends on the longitudinal size of the crack and the depth of the groove depends on the transverse size of said crack.

The rotor is made of a steel alloy including, in particular, Cr, Mo, V, and about 0.26% carbon.

If the rotor has operated at a critical temperature (e.g. higher than 450° C.) it is defragilized by raising it to a temperature greater than 600° C., e.g. 650° C., for a suitable period of time (for example twenty to twenty-four hours).

Thereafter, two or three bottom passes are performed in order to lay two or three layers 2 using a filler metal such as low carbon non-alloyed steel ($\approx 0.06\%$ C).

The base metal of the rotor is diluted in the deposited metal.

Given that the filler metal is non-alloyed, the hardenability of the deposited metal is relatively low, thereby firstly avoiding any increase in residual stress, and secondly obtaining a structure which is not sensitive to cold cracking, and which therefore reduces the overall risk of cracking.

The rotor is provided with abutments 3 and 3' which are used in a later stage.

Figure 8:
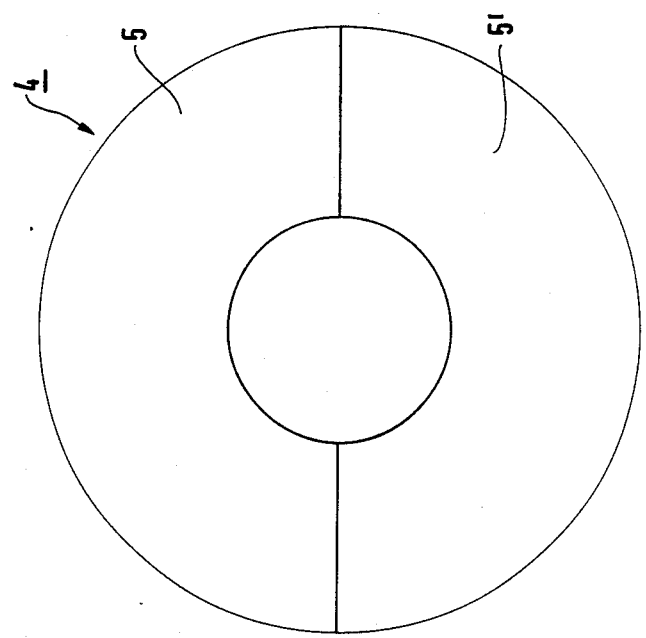
FIG. 8 shows a plate suitable for use in the method of FIGS. 1 to 7.

A steel plate 4 is then placed in the groove 1 (see FIG. 2). Since the groove is circular, said plate 4 is constituted by two semicircular sections 5 and 5' (see FIG. 8).

The plate 4 has a rim 6 provided with a groove 7 suitable for fitting over the abutment 3 and wider than said abutment 3. The plate also has a face 8 extending perpendicularly to the rim 6.

The second face 9 is at an angle of 1° to 2° with the first face 8 and tapers towards said first face going from the bottom of the groove 1 towards its mouth 10. The face 8 is pressed against the wall 11 of the groove 1 so that a space 12 is defined between the inclined face 9 and the second wall 13 of the groove 1.

The plate is made of a lightly alloyed carbon steel having a very low elastic limit (Re $0.2 < 300$ MPa).

Layers 14 are then laid in the space 12 and it is filled up to its mouth 10 (see FIG. 3).

As the layers 14 are laid and solidify, they contract. As a result, the plate 14 pivots about its portion in the bottom of the groove and its face 8 moves away from the wall 11. The groove 7 engages the abutment 3, thereby limiting the extent to which the face 8 moves away. The width of the groove 7 is designed so that the plate 4 stops moving when the face 9 become parallel to the walls 11 and 13.

This occurs when the space 12 is filled about halfway. As further layers 14 are laid, the plate 13 deforms transversely following the shrinking of the layers 14 as they solidify. Such deformation of the plate 14 is made possible by virtue of its very low elastic limit, with the welding filler metal used for laying the layers 14 being in the form of a lightly alloyed wire (less than 5%) using Cr and Mo, and having a high carbon content (lying between 0.16% and 0.22%). It is laid by automatic welding with protection being given by a solid or a gaseous flux. It is also possible to use a special wire or to use manual welding by means of a coated electrode.

The filler metal and the flux (when welding under flux) are selected in such a manner that the solidified layers 14 are made of a lightly alloyed steel having a carbon content lying in the range 0.08% and 0.12%, thereby providing a good compromise between weldability and mechanical characteristics.

Thereafter, the groove 1 is machined in order to get rid of the plate 4 and a portion of the welding filling the space 12, leaving only a facing layer 15 on the wall 13 and the layers 2 on the bottom (see FIG. 4). The facing layer 15 is at least 5 mm thick.

Thereafter, a plate 4' is placed against the layer 15, said plate having the same characteristics as the plate 4 (see FIG. 5).

Layers 14' of welding having the same composition as the welding of the layers 14 are used to fill the space 16 between the wall 11 and the plate 4' (see FIG. 6).

Figure 7:
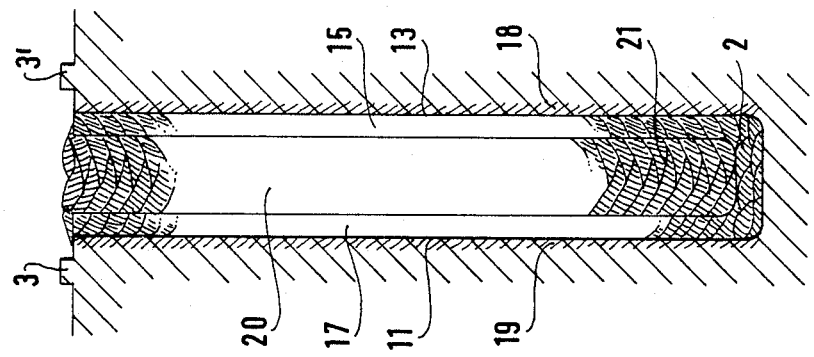

Thereafter, the groove 1 is machined to get rid of the plate 4' and a portion of the welding filling the space 16 so as to leave only a facing layer 17 against the wall 11 having the same thickness as the layer 15 (see FIG. 7). These layers 15 and 17 are made of low alloy steel having a carbon content lying in the range 0.08% to 0.12%, they are therefore easily welded and give rise to low residual stresses.

In the zones of the rotor adjacent to the walls 11 and 13 there are zones 18 and 19 which have been thermally affected in which the steel is mainly in the form of martensite and of bainite which makes the walls very sensitive to residual stress.

By virtue of the presence of the plates 4 and 4' while the spaces 12 and 16 are being filled, there is very little residual contraction stress in the zones 18 and 19, thereby reducing the risks of cracking.

Further, in order to greatly reduce this sensitivity to residual stress and to soften the thermally affected zones, heat treatment is performed in which these zones are raised to a temperature which is not more than the annealing temperature used during manufacture of the rotor.

This temperature (e.g. about 670°) is maintained for about twenty hours.

And thereafter, the space 20 between the facing layers 15 and 17 is filled with weld layers 21 of substantially the same composition as the facing layers 15 and 17. In fact, because the base steel is diluted in the facing layers, the content of steel and alloy metals in the facing layers is 15% to 20% greater than in the layers 21. Since the layers 15 and 17 are made of low alloy steel, they are much less sensitive to cracking than is the initial base metal.

As a result, the final filling creates new thermally affected zones in materials which are less sensitive to cold cracking than the base metal of the rotor, and which therefore accept higher contraction stresses.

Figure 9:
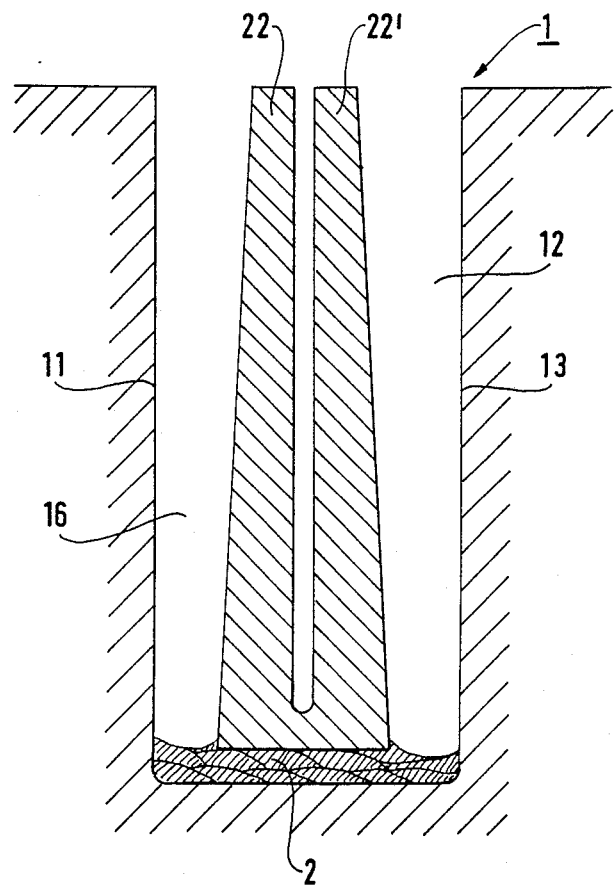
FIG. 9 shows a variant of the method of FIGS. 1 to 7.

When the groove 1 is wide, instead of using two plates 4 and 4', it is possible to use a pair of plates 22, 22' which are welded, e.g. by arc welding, to the layers 2 deposited at the bottom of the groove 1 (see FIG. 9).

The space 12 between the wall 13 and the plate 22' and the space 16 between the plate 22 and the wall 11 are both filled with welding as in the method described with reference to FIGS. 1 to 7. The layers may be laid simultaneously in the two spaces or else one space may be partially filled between moving onto the other, and so on. It is also possible to fill one of the spaces after the other.

The faces of the plates 22 and 22' which together with the walls 13 and 11 defines the spaces 12 and 16 slope away from the associated walls 13 and 11 going from the bottom of the groove towards the top. They become parallel with said walls during the filling of the spaces 12 and 16.

Thereafter, the groove is machined in order to get rid of the pair of plates 22, 22' and to obtain the two facing layers in a single stage for the purpose of defining a space which is then filled as described with reference to FIG. 7.

The heat treatment may be performed before or after getting rid of the pair of plates 22 and 22'.

This variant of the method has the advantage of requiring only one machining step for getting rid of the plates 22 and 22'.

We claim:

1. A method of welding in a groove machined in a solid alloyed steel part, wherein bottom passes are performed and then each wall of the groove is faced with low alloy steel filler material, heat treatment is then performed so as to eliminate the stresses in the zones of the part adjacent to the walls of the groove faced with low alloy steel filler material, and after heat treatment, the empty space between the two facing layers is filled with low alloy steel filler materials, said operation of facing the wall being performed by placing a deformable steel plate having a very low elastic limit in the groove at a certain distance from said wall, by filling the space between the deformable plate and the wall with weld layers of low alloy steel having a carbon content lying in the range of 0.08% to 0.12%, with the plate deforming in a direction towards the weld layers of low alloy steel filler material to follow contraction of the low alloy steel during cooling, thereby reducing the overall risk of cracking of the low alloy steel of the filler material, and by getting rid of the steel plate and optionally a portion of the filler material so as to leave only a layer on the wall and wherein the bottom passes are performed using a non-alloyed low carbon steel as the filler material.

2. A welding method according to claim 1, wherein the carbon steel plate is held fast in the bottom of the groove, and is disposed so that its face facing the wall to be faced slopes slightly away from said wall going from the bottom of the groove towards its mouth.

3. A welding method according to claim 2, wherein the slope angle is selected in such a manner that when the space between the plate and the wall is filled, the face of the plate facing the wall is parallel to said wall.

4. A welding method according to claim 3, wherein said steel part has an abutment adjacent to said groove and said plate has a rim with a transversely oversized groove having opposed sides, loosely receiving said abutment and wherein one side of the plate rim groove comes into contact with the abutment when the face of the plate facing the wall to be faced becomes parallel to said wall by plate deformation.

5. A method according to claim 4, wherein said one side of the plate rim groove comes into transverse contact with the abutment when the space between the plate and the wall is half filled.

6. A method according to claim 1, wherein while the space between the plate and the wall to be faced is being filled, the bottom portion of the plate remains in contact with the other wall which may optionally have a facing layer.

7. A method according to claim 1, wherein a pair of plates are disposed on the middle portion of the groove, thereby defining, in conjunction with the two walls, two spaces to be filled.

8. The method according to claim 1 for repairing a rotor having a defect wherein said steel part groove is a circular groove machined at the location of the defect and the plate inserted therein is constituted by circular half-sectors.

* * * * *